United States Patent
Duri et al.

(10) Patent No.: US 7,353,532 B2
(45) Date of Patent: Apr. 1, 2008

(54) SECURE SYSTEM AND METHOD FOR ENFORCEMENT OF PRIVACY POLICY AND PROTECTION OF CONFIDENTIALITY

(75) Inventors: Sastry S. Duri, Yorktown Heights, NY (US); Xuan Liu, Yorktown Heights, NY (US); Paul A. Moskowitz, Yorktown Heights, NY (US); Ronald Perez, Mount Kisco, NY (US); Edith G. Schonberg, New York, NY (US); Moninder Singh, Middletown, CT (US); Charles P. Tresser, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 804 days.

(21) Appl. No.: 10/233,340

(22) Filed: Aug. 30, 2002

(65) Prior Publication Data
US 2004/0054919 A1     Mar. 18, 2004

(51) Int. Cl.
G06F 17/30     (2006.01)
H04K 1/00     (2006.01)
H04L 9/00     (2006.01)

(52) U.S. Cl. .................. 726/1; 726/27; 713/185; 713/189; 713/193; 707/1; 707/10

(58) Field of Classification Search ............ 726/26, 726/29, 30, 27, 1
See application file for complete search history.

(56) References Cited

U.S. PATENT DOCUMENTS 5,164,988 A     11/1992     Matyas et al.
5,502,766 A     3/1996     Boebert et al.

(Continued)

FOREIGN PATENT DOCUMENTS

WO     WO 0141007 A2     6/2001

OTHER PUBLICATIONS

"Browser cookies which help web servers alert users of potential security violations," IBM Research Disclosure #448160, Aug. 2001, author unknown.

(Continued)

*Primary Examiner*—Gilberto Barron, Jr.
*Assistant Examiner*—Abdulhakim Nobahar
(74) *Attorney, Agent, or Firm*—James Palmer; Hoffman, Warnick & D'Alessandro LLC

(57) ABSTRACT

The invention includes various systems, architectures, frameworks and methodologies that can securely enforce a privacy policy. A method is include for securely guaranteeing a privacy policy between two enterprises, comprising: creating a message at a first enterprise, wherein the message includes a request for data concerning a third party and a privacy policy of the first enterprise; signing and certifying the message that the first enterprise has a tamper-proof system with a privacy rules engine and that the privacy policy of the first entity will be enforced by the privacy rules engine of the first enterprise; sending the message to a second enterprise; and running a privacy rules engine at the second enterprise to compare the privacy policy of the first enterprise with a set of privacy rules for the third party.

14 Claims, 3 Drawing Sheets

U.S. PATENT DOCUMENTS

| | | | |
|---|---|---|---|
| 5,881,155 | A | 3/1999 | Rigal |
| 5,933,498 | A | 8/1999 | Schneck et al. |
| 5,933,503 | A | 8/1999 | Schell et al. |
| 5,987,440 | A | 11/1999 | O'Neil et al. |
| 5,999,908 | A | 12/1999 | Abelow |
| 6,158,007 | A | 12/2000 | Moreh et al. |
| 6,237,786 | B1 | 5/2001 | Ginter et al. |
| 6,253,193 | B1 | 6/2001 | Ginter et al. |
| 6,260,019 | B1 | 7/2001 | Courts |
| 6,292,899 | B1 | 9/2001 | McBride |
| 6,304,973 | B1 | 10/2001 | Williams |
| 6,314,409 | B2 | 11/2001 | Schneck et al. |
| 6,351,812 | B1 | 2/2002 | Datar et al. |
| 6,360,254 | B1 * | 3/2002 | Linden et al. .............. 709/219 |
| 6,389,402 | B1 | 5/2002 | Ginter et al. |
| 6,904,417 | B2 * | 6/2005 | Clayton et al. .............. 705/59 |
| 2003/0163427 | A1 * | 8/2003 | Fung et al. .................. 705/51 |

OTHER PUBLICATIONS

Hind, J.R. et al., "Enforcing data policy using style sheet processing," IBM pending patent application, Aug. 1999.

Barzilai, Z. et al., "Business privacy in the electronic marketplace," IBM pending patent applications—Sep. 2000.

Lisada L. et al., "Vault controller based registration application serving web based registration authorities and end users for conducting electronic commerce in a secure end-to-end distributed information system," IBM pending patent application—Dec. 1998.

"Privacy informant—CYM standards," IBM Research Disclosure #438067, Oct. 2000, author unknown.

Strauss, J., Rogerson, K., "Policies for Online Privacy in the United States and the European Union," http://jsis.artsci.washington.edu/progra.../Netconference/Strauss-RogersonPaper, date unknown.

Herzberg, A. et al., "System for automated trust and role assignment based on a web of public key attribute certificates," IBM pending patent application—Apr. 1999.

* cited by examiner

SECURE SYSTEM AND METHOD FOR ENFORCEMENT OF PRIVACY POLICY AND PROTECTION OF CONFIDENTIALITY

BACKGROUND OF THE INVENTION

1. Technical Field

The present invention relates generally to network-based data privacy policies, and more particularly to a system and method of implementing a secure privacy policy.

2. Related Art

As the amount of information transmitted over networks by businesses, individuals and other entities continues to grow, the ability to guarantee privacy of information has become an ongoing challenge. For example, users that subscribe to a provider's services are often required to disclose sensitive personal information such as credit card information, medical information, family information, etc. The only safeguard available to such users is the privacy policy of the provider. Unfortunately, it is often impractical for an end-user to manually check the privacy policies of each provider that they may encounter, particularly in a network environment such as the Internet where policies can change over time and the actual provider of some service (e.g., credit approval) may be transparent to the end-user.

To address this, automated privacy policy matching systems have been proposed that compare the privacy requirements of a user with the privacy policy of each provider to ensure that the privacy rights of the user are maintained. In such systems, data is only released if the privacy constraints of the user can be met. Thus, as long as he or she trust the parties he or she deals with, an end-user can be confident that any entity collecting their personal data will not use the data in manner that is proscribed by the end-user. Such a system is described in U.S. patent application Ser. No. 10/046,034, filed on Nov. 7, 2001, entitled "System, Method, and Business Methods for Enforcing Privacy Preferences on Personal-Data Exchanges Across a Network," which is hereby incorporated by reference.

Unfortunately, the efficacy of such privacy policy matching systems is completely dependent on the integrity of the people and organizations that provide the services, or otherwise have access to the data. For instance, even though a provider may guarantee data will not be used or sold without the consent of the end-user, there is nothing to prevent an employee of the service provider from stealing personal information. Accordingly, present matching systems may not always provide the necessary level of security to guarantee privacy.

Particular issues arise for individuals who want to either store data at a secure data repository, or who need to provide their data to a third party subject to a privacy policy. In these cases, like those mentioned above, the mere fact that the involved entities have a privacy policy and/or a matching system does not guard against outright theft and/or tampering. In particular, even if the party the end user is dealing with is reputable and has adopted a good privacy policy system, nothing prevents indelicate agents from tempering with or stealing private data. Accordingly, a need exists for a privacy policy system that includes the necessary security to ensure data privacy for individuals disclosing private information.

SUMMARY OF THE INVENTION

The present invention addresses the above-mention problems, as well as others, by providing various systems, architectures, frameworks and methodologies that can enforce a privacy policy in a secure environment. In particular, a service provider can offer means to a customer to check that the policy advertised by the service provider will indeed be enforced with no possible violation. For instance, the policy will be enforced by special equipment that comprises some secure hardware, such as the IBM 4758™ PCI Cryptographic Coprocessor, and include means to process data such that protection by the secure hardware is effective.

In a first aspect, the invention provides a data repository system that can securely guarantee a privacy policy of a user, comprising: (1) an initialization system, wherein the initialization system includes: a system for providing the user with a privacy policy of the data repository and a mechanism for validating the privacy policy of the data repository, and a system for collecting user data from the user, wherein the user data comprises a description of validity tokens authorizing a third party access to a subset of the user data from the data repository; and (2) a referral system for providing the third party access to the subset of the user data, including: a system for checking that a privacy policy of the third party is compatible with the privacy policy of the user; a system for digitally encoding the subset of data.

In a second aspect, the invention provides a method of controlling user data in a data repository subject to a privacy policy of the user, comprising: providing the user with a privacy policy of the data repository, a public signature key, and a site of a validator; communicating with the validitor to validate the public signature key; validitating the privacy policy of the data repository with the public signature key; submitting the privacy policy of the user to the data repository; checking to determine if the privacy policy of the user matches the privacy policy of the data repository; and sending user data from the user to the data repository, wherein the user data includes a description of validity tokens that authorizes a third party access to a subset of the user data from the data repository.

In a third aspect, the invention provides a program product stored on a recordable medium for providing a data repository that can securely guarantee a privacy policy of a user, the program product comprising: means for providing the user with a privacy policy of the data repository, and for providing a mechanism for validating the privacy policy of the data repository, and means for collecting user data from the user, wherein the user data comprises a description of validity tokens authorizing a third party access to a subset of the user data from the data repository; means for checking that a privacy policy of the third party is compatible with the privacy policy of the user; and means for digitally encoding the subset of data to be transmitted to the third party.

BRIEF DESCRIPTION OF THE DRAWINGS

These and other features of this invention will be more readily understood from the following detailed description of the various aspects of the invention taken in conjunction with the accompanying drawings in which.

DETAILED DESCRIPTION OF THE INVENTION

As noted above, the present invention provides various mechanisms for securely guaranteeing a privacy policy for an individual that wants to store information with a secure data repository, and/or that wants to disclose information directly to a third party (e.g., a merchant). In general, a privacy policy dictates the type of information or data that will be kept private for an individual relative to some service provider. The present invention sets forth various secure embodiments that ensure compliance with the privacy policy.

Figure 1:
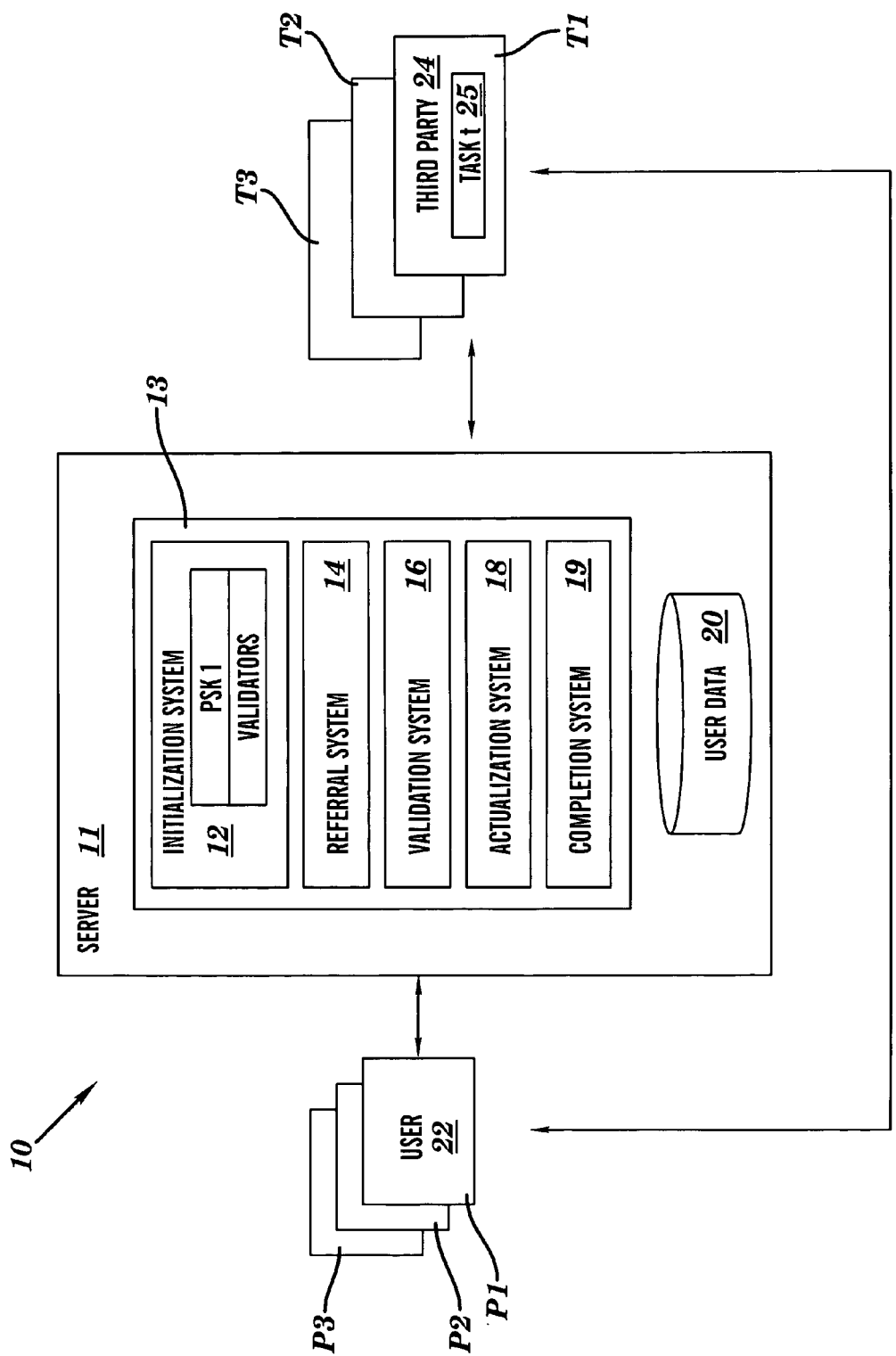
FIG. 1 depicts a data repository system having a secure privacy policy system.

Referring to FIG. 1, a secure data repository system 10 is depicted ("repository"). Repository 10 comprises a server 11 having a database 20 for storing data for user 22, and privacy policy systems 13 for securely guaranteeing a privacy policy associated with data from user 22. While repository 10 is shown implemented using a server 11 accessible by a plurality of users over a network (e.g., the Internet), it could be implemented as part of the user's system. In either case, repository 10 may comprise standard computer system elements, such as a processor, memory, an input/output, a bus, system software, etc. Privacy policy systems 13 may be implemented, for example, in software (i.e., as program products) that runs on a computer system associated with repository 10. Repository 10 may comprise any type of institution that stores personal or private user data, for instance customer information such as credit card balance information, name, address, payment history, etc.

In certain instances, a third party 24 may require user data to accomplish some task 25 on behalf of, or for the benefit of the user 22. Third party 24 may request data from repository 10 regarding a user 22, or repository 10 may contact third party 24 to accomplish the task 25. An example for the former case may involve the need to obtain a credit report for the user 22 in order to obtain a loan from a third party. For the purposes of describing the invention, the requested data comprises a data set S(P,T,t), where P represents the user (e.g., P1, P2, P3), T represents the third party (e.g., T1, T2, T3), and t represents the task. Thus, in the credit report scenario described above, the data set S(P,T,t) would be dependent on the credit report data necessary for processing a loan (task t) for a borrower P, from a financial institution T.

Two necessary systems for implementing a secure data repository 10 include an initialization system 12 and referral system 14. Initialization system 12 provides the necessary mechanisms through which a user P can first store data in the repository 10. Referral system 14 provides the necessary mechanisms through which a third party T can obtain a set of user data S(P,T,t) from the repository 10.

Figures 2, 3:
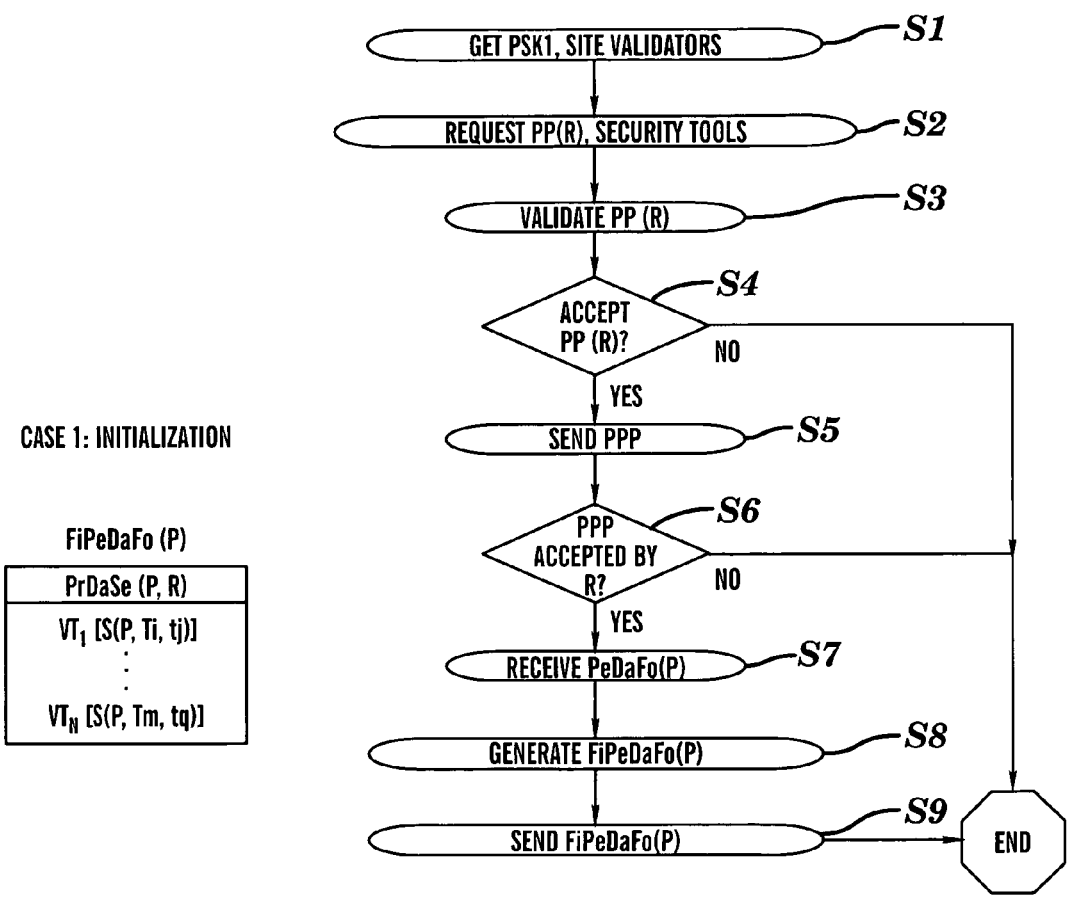
FIG. 2 depicts a method of implementing an initialization system of the data repository of FIG. 1.
FIG. 3 depicts a filled personal data form having a description of validity token.

FIG. 2 provides a flow diagram showing the operation of initialization system 12 that runs from a remote server, such as that shown in FIG. 1. (If repository 10 exists as part of the user's system, initialization is a trivial application of known secure computing techniques, and is not discussed further herein.) Assuming that repository 10 exists separately from user P, initialization system 12 operates as follows with reference to FIG. 2. The first step is to first get P's data securely into repository 10. To achieve this, P must first visit repository 10 and obtain the repository's public signature key PSK1, and one or more web sites of associated "validators" (step S1). A validator may comprise any entity (e.g., a hardware installer) that can verify that PSK1 is the key generated by some secure hardware, such as the IBM 4758™ PCI Cryptographic Coprocessor ("4758"). Thus, P can access the validator's site to verify that PSK1 belongs to a specific repository "R." Alternatively, P may access the validator through other means such as, telephone or printed material. In some instances, the user may be advised to visit the validator(s) site several times to protect against a temporary break-in of hackers on such sites. Validation can also be facilitated by using a plurality of media, such as various publications, and entities such as consumer unions' sites or referral systems such as a dedicated phone line or e-mail address. In addition, it may be preferable that all communications between P and repository 10 be kept secret using known security technologies.

Next, at step S2, P asks for the privacy policy of repository 10, and any security tools such as hash functions and digital signatures. Initialization system 12 then provides the repository's hash functions and digital signatures to P, as well as the privacy policy of repository 10 "PP(R)" signed using PSK1 (possibly after secure hashing), which are then validated by P (step S3), or possibly by some reputable guarantor. Exemplary privacy policies of repository 10 may include:
  (a) PP(R) will stipulate that no human agent has ever access to any data that can be associated to P;
  (b) PP(R) will stipulate that no human agent has ever access to any data that belong to P;
  (c) PP(R) will stipulate how human agent can get access to any or some data that belong to P, either with proper authorization from P, or with a warrant;
  (d) PP(R) may stipulate that R will have access, some access, or no access to change his/her/its own data as they are stored by R;
  (e) PP(R) may stipulate that every period delta, the participation of P will be canceled if not confirmed by P;
  (f) PP(R) will describe which Personal Privacy Policies PPP it can accommodate, and provides the form FPPP where such policies can be described;
  (g) PP(R) may describe which standard forms of subsets of the data set of P it may accept to communicate using short instructions validated by P;
  (h) PP(R) may describe that any subset of the data set of R, as described for instance by an item list, can be communicated if the demand is validated by R.

Next, P reads PP(R), possibly through a policy reader installed on P's computer, that provides decision factors preset by P or some other party that P may trust (for any of a plurality of reasons such as recommendation by a friend or good reviews in the press) and either refuses or accepts PP(R) at step S4. If PP(R) is not acceptable, then the relationship between P and R is aborted. Otherwise, the following steps are taken. First, P may check with the validator that PP(R) is what is to be expected from R. Alternatively P may rely on the signature of PP(R) by R using PSK1. Then, P may securely (as is well known in the art) send P's own Personal Privacy Policy PPP(P) to R using a Personal Privacy Policy Form FPPP (step S5). Upon receipt by R, a decision is made to accept PPP by R (step S6). Namely, either FPPP can be devised so that any PPP that fits on FPPP is compatible with PP(R), or R can manually check that PPP(P) is compatible with PP(R). If PPP(P) is not accepted by R, then the relationship between P and R is aborted. If PPP(P) is accepted by R, then initialization system 12 continues as follows. R securely (as is well known in the art) sends (or otherwise makes available) to P a Personal Data Form PeDaFo (P) that is compatible with PP(R) and PPP(P) at step S7. P manually or automatically fills out PeDaFo (P), thus producing Filled Personal Data Form FiPeDaFo (P) that contains Primary Data Set PrDaSe (P,R) that is compatible with PPP(P) and PP(R) at step S8. This form will then be sent to R at step S9. Part of what FiPeDaFo (P) will contain is the description of validity tokens VT[S(P,Ti,tj)] that P will use to authorize third parties T1,T2,T3, . . . to access special subsets S(P,Ti,tj) of PrDaSe (P,R) depending on tasks t1, t2, t3, . . . . . An exemplary FiPeDaFo (P) is shown in FIG. 3.

In some cases, P may provide the public part of P's Digital Signature ppDS(P), or a plurality thereof if different machines used by P have different signatures, in the Filled Personal Data Form FiPeDaFo (P). Alternatively, a one time pad (i.e., a unique collection of symbols known only to P and R as is well known in the art of cryptography) can be established, in which case at least one machine of P will need to administer this pad, possibly with tools provided by R. A combination of these two techniques can be used, in particular depending on the machine P uses when communicating.

Any confidential data about P, defined as data P considers confidential, or data that is described by R as confidential, and accepted as such by P, arrives at R only in encrypted form, so that it can only be decrypted inside R's 4758 or similar equipment (i.e., secure environment). Similarly, any confidential data about P only circulates or gets stored at R's location or R's dependencies in encrypted form, so that it can only be decrypted inside R's secure environment. If confidential data about P is decrypted in R's secure environment to be sent to any party accepted by P or imposed by law, before leaving the secure environment it will first be encrypted by means that the accepted or legally imposed party can decrypt. In this case, the encrypting means will first be checked by R to be certain that it is a valid means of secure encryption. The competencies of R in validating such other party's encryption scheme could indeed become part of how one evaluates such service providers.

Figure 4:
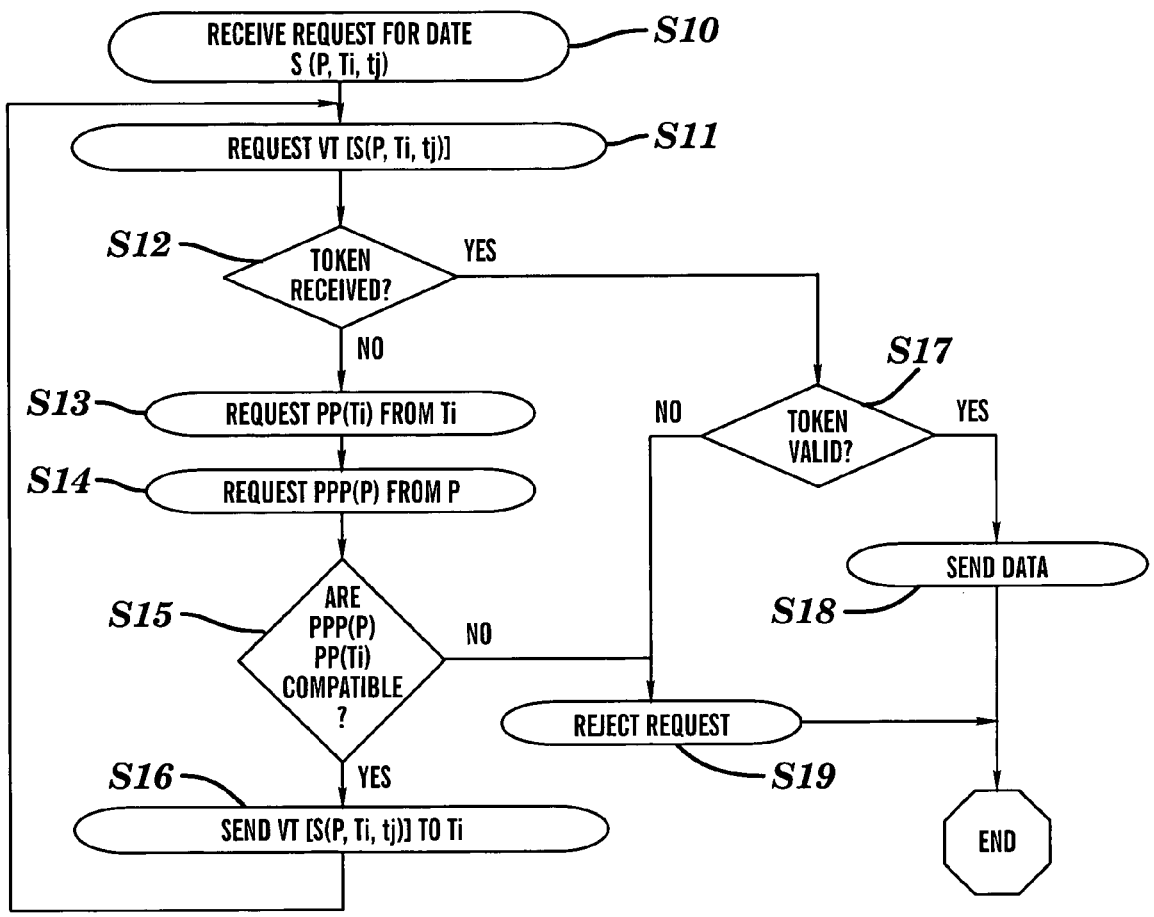
FIG. 4 depicts a method of implementing a referral system of the data repository of FIG. 1.

Once the data is stored in repository 10, third parties have potential access to it via referral system 14. A flow diagram showing the operation of referral system 14 is depicted in FIG. 4. As noted above, referral system 14 is utilized when some third party Ti contacts P or is contacted by P, and asks for some data set S(P,Ti,tj) to accomplish some task tj, on behalf and/or to the benefit of P (step S10). As noted above, Ti must have a validity token to obtain a data set. If Ti does not already have a validity token, referral system 14 checks the compatibility of the third party's privacy policy, PP(Ti), with P's personal privacy policy PPP(P) at steps S12, S13, S14 and S15. If they are compatible, referral system 14 then provides a validity token VT[S(P,Ti,tj)] to Ti (step S16). It is understood that the token may have only some limited time of validity, or that it is only valid for some number N of requests, e.g., N=1. It may also be the case that R takes on the responsibility of verifying that PP(Ti) is compatible with tj and PPP(P). Once the third party Ti has the validity token VT[S(P,Ti,tj)], Ti can ask R for S(P,Ti,tj), assuming all of the compatibility works as checked by P, R, or both of them (i.e., the token is valid as determined by step S17). Once it is determined that the token is valid, data will be sent to the third party at step S18. If the token is not valid (e.g., time has expired) then the request is rejected at step S19.

Depending on the case, the token VT[S(P,Ti,tj)] may authorize Ti to request any subset, or some limited subset, of S(P,Ti,tj). The structure of VT[S(P,Ti,tj)] may require that S(P,Ti,tj) be signed by R possibly in conjunction with time of delivery, possibly in conjunction with some identifier of Ti (such as a public signature key possession evidence), or possibly with some description of the task tj.

The structure of VT[S(P,Ti,tj)] may require that S(P,Ti,tj) be encrypted by R using a key k that may depend on tj, possibly in conjunction with time of delivery, with some identifier of Ti (such as a public signature key possession evidence), or with some description of the task tj. Under these circumstances, either: (1) k belongs to R, in which case, the entity that Ti will deal with will have to come back to R (for instance if the entity is a Government agency that P has listed as having any access they need for given tasks), or (2) k belongs to the entity, and R will get this key by some secure means (as well known in the art).

In addition to the initialization and referral systems described above, repository 10 may also include validation system 14 that allows R to check that data provided by P, or on behalf of P, is valid. Validity may be guaranteed by digital signatures, which would then possibly take on the responsibility of establishing whichever party signs the data to be correct: for instance, if P is asked to sign, P guaranties that in good faith, all data is true; if R signs the data, R acknowledges the data is consistent to what was provided to R by P and possibly also that R has made some verification of the data before accepting to provide data on the behalf of P. Alternatively, some form of best diligence of verification may be acceptable. For example, R notifies P that R has done its best to verify the data. Sources may be cited, possibly with such citations signed. In some embodiments, public key schemes such as RSA (Rivest, Shamir, and Adleman) could be used. In the future, more advanced schemes such as quantum cryptography could be employed.

Completion system 16 may be utilized by repository 10 to complete the data provided by P, according to instructions by P and/or some applicable regulations. For instance, R may seek credit information about P, possibly offering some services to P only if P agrees on R collecting such data (which may or may not need to be disclosed to P, according to regulation and the contract between R and P). Actualization system 18 handles situations when P's data is updated, and/or authorization needs to be given to R by P to continue to keep P's data after they are updated. For instance, R may collect data from public sources to provide an updated valuation of the credit rating of P, or R may need revalidation by P, e.g., every year, every six months or even of its right to keep any data about P.

In addition to the scenario described above, the case is addressed where P and/or R want to provide data to a third party T that guarantees some privacy policy. In a typical scenario, the third party is a merchant M, and the user P is a purchaser. However, it should be understood that this embodiment could apply to any situation where a user needs to provide data directly to some other entity.

In order to provide a secure and guaranteed privacy policy, all communication of data to the merchant M, by P, should be done through a secure hardware device of the merchant, such as the 4758 or similar machine. Furthermore, M may be required to guarantee that the data about P will stay protected, according to rules that M describes or to rules that M accepts from P or R, using a 4758 or similar hardware device that prevents unwanted access to the data or malevolent access or misappropriation of the data by people working for M. However, in some cases (defined by the P's privacy policy and or the secure repository R 10) P and/or R may communicate some data to M even if M does not use secure hardware.

To complement the discussion above for the referral system 12, a way for R to control that M has been authorized by P to access some subset S of P's data at R is by using a single (Private, public) encryption pair (K(R), k(R)), with K(R) held by R, and k(R) distributed to all the customers of R. R also gives P a password w(R, P). To provide M with the authorization, P prepares a message:

Mess=(w(R, P), description of (S), description of third party (T) that can be for instance a merchant or some government agency, time stamp, rules of validity of the authorization), encrypts Mess using k(R) (the public part of the Public Key encryption scheme that belongs to R), producing the encrypted message k(R)(Mess), and sends k(R)(Mess) to M. M forwards to R where the key K(R) is held (as R is expected to be the sole owner of the secret part of its own public encryption scheme), which allows R to reconstruct Mess as K(R)(k(R)(Mess)), since K(R) is the inverse function of k(R). Of course, provisions can be made that some regulatory bodied may have copies of K(R) that can be used with proper warrant, but preferably such provisions should be known to P who may prefer then to not trust R.

A variety of methods well known in the art of secure communication can be used in the transaction between P and M to ensure both of them know whom they are dealing with. Preferably, the function K(R) will only be used inside the 4758 or similar environment (secure environment) so that at R's location, no human can access data about P in clear form: before being sent to T, the data is then encrypted by means that T, but not anyone at R's location can decrypt before getting out of the secure environment and being shipped to T. R may have to check the solidity of the encryption method used by T before allowing communicating data to T using these methods.

The guaranteed enforcement is possible through a secure computer that executes data handling software signed by R and other interested parties including auditing agencies. In particular, it is the function of the auditing agencies to verify that secure data handling routines individually or in combination extract data, analyze, or perform other computations that conform to PP(R)'s policies. In addition, the secure computer is setup such that it only accepts the software, configuration, and policies signed by required parties. So by verifying signatures accompanying a PP(R) exchange, and verifying the fact that PP(R) indeed executes on a secure computer, one could be certain of its guaranteed enforcement. For reference, see U.S. patent application Ser. No. 09/663,664, "Using Trusted Co-Servers to Enhance Security of Web Interaction," by Sean W. Smith et. al., filed Sep. 15, 2000, which his hereby incorporated by reference.

In some cases, P's privacy policy may dictate that P's identity remains private. Unfortunately, where P has ordered some hard good that needs to be shipped to P, protecting P's identity becomes a challenge. Even in the case where the deliverables are soft (i.e., delivered via a network), technologies exist to guarantee delivery of the goods with full privacy protection in the sense that the seller of the goods does not know who the buyer is, the deliverer does not know what is bought, and the financial institutions involved also have only partial knowledge, insufficient to compromise privacy. See, e.g., U.S. patent application Ser. No. 09/129, 826, "Method and Apparatus for Remote Commerce with Customer Anonymity," filed Aug. 5, 1998, for hard goods, and U.S. patent application Ser. No. 09/569,068, "Achieving Buyer-Seller Anonymity for Unsophisticated Users Under Collusion Amongst Intermediaries," filed May 11, 2000, which are hereby incorporated by reference.

The secure databases required for guaranteeing a privacy policy could be easily adapted using the above inventions, as well as other forms of confidentiality preserving delivery schemes. Respecting the privacy of the customers according to their privacy policies will not prevent the owner of the database or others who have access to it, to do marketing and statistical analysis. To some degree, personal care will be provided if designated by the customer as desirable.

There are two additional cases that may be more difficult to address. One is when the purchaser P, but not necessarily the customer's actual identity needs to be known to M (i.e., all customer data must be identifiable as corresponding to the same person, who, e.g., has some means, possibly other than actual identity, to be recognized). This scenario often arises in the insurance industry, and is discussed in U.S. patent application Ser. No. 09/578,474, "Method and Apparatus for Commerce With Full Anonymity," filed May 26, 2000, which is hereby incorporated by reference.

The other case is when the actual identity must be known, e.g., as in the banking industry. In this case, some anonymous services can still be provided so long as it can be verified that the beneficiary is entitled to the services, as described in U.S. patent application Ser. No. 09/779,954, "System and Method for Maintaining Customer Privacy," filed Feb. 9, 2001, which is hereby incorporated by reference.

In these cases, if there is serious level of interaction, in particular out of the pure soft world, secure coprocessors may not be sufficient, and some third party will have to sign off and inspect that protocols are indeed in place and respected. Using the techniques described in the above applications, processes can be readily implemented that protect privacy and/or anonymity, (and/or confidentiality can be inspected) without anyone having access to confidential data.

It is understood that the systems, functions, mechanisms, methods, and modules described herein can be implemented in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods and functions described herein, and which—when loaded in a computer system—is able to carry out these methods and functions. Computer program, software program, program, program product, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of the invention have been presented for purposes of illustration and description. They are not intended to be exhaustive or to limit the invention to the precise form disclosed, and obviously many modifications and variations are possible in light of the above teachings. Such modifications and variations that are apparent to a person skilled in the art are intended to be included within the scope of this invention as defined by the accompanying claims. For example, in some cases, R may be a service working exclusively for or belonging to some merchant M or other institution such as a Bank or an Insurance company, and the third parties T1, T2, . . . may be a variety of services or departments of M.

The invention claimed is:

1. A data repository system that can securely guarantee a privacy policy of a user, comprising:
   an initialization system, wherein the initialization system includes:
      a system for providing the user with a privacy policy of the data repository and a mechanism for validating the privacy policy of the data repository, wherein the mechanism for validating the privacy policy includes providing to the user a public signature key and means to access at least one validator, wherein the validator is a guarantor of hardware for the data repository system, the public signature key is a key generated by the hardware, and the validator can validate the key, and
      a system for collecting user data from the user, wherein the user data comprises a description of expirable validity tokens authorizing a third party access to a subset of the user data from the data repository, wherein the expirable validity tokens are expirable after one of a limited time or a limited number of requests from the third party; and
      a referral system for providing the third party access to the subset of the user data upon the third party providing a valid expirable validity token, wherein the referral system digitally signs and digitally encrypts the subset of data, including:
      a system for checking that a privacy policy of the third party is compatible with the privacy policy of the user;
      a system for digitally encoding the subset of data;
      a system for requesting an expirable validity token from the third party; and
      a system for verifying the validity of the expirable validity token from the third party.

2. The data repository system of claim 1, wherein the means to access is selected from a group consisting of a web site, printed material, and a telephone.

3. The data repository system of claim 1, wherein the validity of the key can be established from the group consisting of a consumer group and a publication in printed media.

4. The data repository system of claim 1, wherein the guarantor of hardware is a provider of the hardware.

5. The data repository system of claim 1, wherein the privacy policy of the data repository is signed with the public signature key of the data repository.

6. The data repository system of claim 1, wherein the privacy policy of the data repository is signed with the public signature key of a reputable guarantor.

7. The data repository system of claim 1, wherein the user data is collected in a filled personal data form that is digitally encoded.

8. A method of controlling user data in a data repository subject to a privacy policy of the user, comprising:
   providing the user with a privacy policy of the data repository, a public signature key, and a site of a validator, wherein the validator is a guarantor of hardware for the data repository system, the public signature key is a key generated by the hardware, and the key is validated by one from the group consisting of the validator, a consumer group, and a publication in printed media;
   communicating with the validitor to validate the public signature key;
   validitating the privacy policy of the data repository with the public signature key;
   submitting the privacy policy of the user to the data repository;
   checking to determine if the privacy policy of the user matches the privacy policy of the data repository;
   sending user data from the user to the data repository, wherein the user data includes a description of expirable validity tokens that authorizes a third party access to a subset of the user data from the data repository, wherein the expirable validity tokens are expirable after one of a limited time or a limited number of requests from the third party;
   requesting an expirable validity token from the third party;
   verifying the validity of the expirable validity token from the third party;
   providing the third party access to the subset of the user data upon the verifying requesting a subset of data from a third party to the user;
   checking that a privacy policy of the third party is compatible with the privacy policy of the user;
   providing a validity token to the third party from the user;
   requesting from the data repository a validity token from the third party; and
   providing to the third party the requested subset of data, wherein the step of providing a validity token to the third party from the user, includes:
      providing a public key/private key encryption pair;
      sending an encoded message to the third party signed with the public key, wherein the encoded message includes a password and validation information;
      providing the data repository with the private key; and
      passing the encoded message to the data repository from the third party, along with the location of the private key.

9. The method of claim 8, wherein the guarantor of hardware is a provider of the hardware.

10. The method of claim 8, wherein the step of sending user data from the user to the data repository includes the steps of:
    securely sending to the user from the data repository a data form that is compatible with the privacy policy of the user and of the data repository;
    filling out the data form in a manner that is compatible with the privacy policy of the user and of the data repository; and
    including in the filled out data form the description of the validity tokens; and
    securely sending the filled out data form to the data repository.

11. The method of claim 8, wherein the step of providing the user with the privacy policy of the data repository includes the step of signing the privacy with a public signature key of one selected from the group consisting of a reputable guarantor and the data repository.

12. A program product stored on a recordable medium for providing a data repository that can securely guarantee a privacy policy of a user, the program product comprising:

means for providing the user with a privacy policy of the data repository, and for providing a mechanism for validating the privacy policy of the data repository, wherein the mechanism for validating the privacy policy includes providing to the user a public signature key and a site of at least validator, wherein the validator is a provider of hardware for the data repository, the public signature key is a key generated by the hardware, and the validator can validate the public signature key;

means for collecting user data from the user, wherein the user data comprises a description of expirable validity tokens authorizing a third party access to a subset of the user data from the data repository, wherein the expirable validity tokens are expirable after one of a limited time or a limited number of requests from the third party;

means for checking that a privacy policy of the third party is compatible with the privacy policy of the user;

means for digitally encoding the subset of data to be transmitted to the third party;

means for requesting an expirable validity token from the third party;

means for verifying the validity of the expirable validity token from the third party;

means for authorizing access to the third party of the user data upon the verifying; and means for digitally signing and digitally encrypting the subset of data.

13. The program product of claim 12, wherein the privacy policy of the data repository is signed with the public signature key.

14. The program product of claim 13, wherein the user data is collected in a filled personal data form that is digitally encoded.

* * * * *